US008566342B2

(12) United States Patent  (10) Patent No.: US 8,566,342 B2
Aluf-Medina  (45) Date of Patent: Oct. 22, 2013

(54) IN-MEMORY DATA OPTIMIZATION SYSTEM

(75) Inventor: Mario Aluf-Medina, New York, NY (US)

(73) Assignee: Berm Logic LLC, Mamaroneck, NY (US)

( * ) Notice: Subject to any disclaimer, the term of this patent is extended or adjusted under 35 U.S.C. 154(b) by 437 days.

(21) Appl. No.: 12/754,695

(22) Filed: Apr. 6, 2010

(65) Prior Publication Data

US 2010/0191764 A1  Jul. 29, 2010

Related U.S. Application Data

(63) Continuation-in-part of application No. 11/419,618, filed on May 22, 2006, now Pat. No. 7,924,820, which is a continuation of application No. 11/295,977, filed on Dec. 7, 2005, now abandoned.

(60) Provisional application No. 61/167,359, filed on Apr. 7, 2009.

(51) Int. Cl.
*G06F 17/30* (2006.01)

(52) U.S. Cl.
USPC ........................................................ 707/769

(58) Field of Classification Search
CPC .......... G06F 17/3048; G06F 17/30321; G06F 17/30902; H04L 29/12207; H04L 61/20
USPC .......................... 707/600, 602, 607, 736, 769
See application file for complete search history.

(56) References Cited

U.S. PATENT DOCUMENTS

| 6,069,890 | A | 5/2000 | White et al. |
| 6,243,374 | B1 | 6/2001 | White et al. |
| 6,304,867 | B1 * | 10/2001 | Schmidt ................................ 1/1 |
| 6,539,077 | B1 | 3/2003 | Ranalli et al. |
| 6,594,254 | B1 | 7/2003 | Kelly |
| 6,674,745 | B1 | 1/2004 | Schuster et al. |
| 6,757,250 | B1 | 6/2004 | Fayad et al. |
| 6,772,210 | B1 | 8/2004 | Edholm |
| 6,810,034 | B1 | 10/2004 | Brand |
| 6,826,174 | B1 | 11/2004 | Erekson et al. |
| 6,928,154 | B1 | 8/2005 | Cheaito et al. |
| 7,246,154 | B1 | 7/2007 | Sitaraman et al. |
| 7,440,456 | B2 | 10/2008 | Furukawa et al. |

(Continued)

FOREIGN PATENT DOCUMENTS

| EP | 0 881 812 A | 12/1998 |
| JP | 2001-111624 A | 4/2001 |

(Continued)

OTHER PUBLICATIONS

International Search Report & Written Opinion issued in the counterpart International Application No. PCT/US10/36037, US International Searching Authority, Jul. 14, 2010.

*Primary Examiner* — Jorge A Casanova

(74) *Attorney, Agent, or Firm* — Gottlieb, Rackman & Reisman PC

(57) ABSTRACT

The present invention is directed to database applications in which the identification of entries is structured in a custom way using templates. The means for identification is used as a vehicle for submitted queries to and obtaining responses from the database such that the query and response process is significantly faster than applications presently in use.

20 Claims, 6 Drawing Sheets

(56) References Cited

U.S. PATENT DOCUMENTS

| | | |
|---|---|---|
| 2001/0028642 A1 | 10/2001 | Veschi |
| 2001/0049746 A1 | 12/2001 | Shin |
| 2002/0095516 A1 | 7/2002 | Nada |
| 2003/0002476 A1 | 1/2003 | Chung et al. |
| 2003/0095542 A1 | 5/2003 | Chang et al. |
| 2003/0215079 A1 | 11/2003 | Watanabe |
| 2004/0081141 A1 | 4/2004 | Chen et al. |
| 2004/0131053 A1 | 7/2004 | Sjolulnd et al. |
| 2004/0143562 A1* | 7/2004 | Chen et al. ................. 707/1 |
| 2004/0199516 A1* | 10/2004 | Thames et al. ............ 707/100 |
| 2004/0225673 A1 | 11/2004 | Beck et al. |
| 2006/0167895 A1* | 7/2006 | Shim ............................ 707/10 |
| 2007/0127507 A1 | 6/2007 | Aluf-Medina |
| 2008/0059412 A1 | 3/2008 | Tarin |
| 2011/0138123 A1* | 6/2011 | Gurajada et al. ............ 711/118 |

FOREIGN PATENT DOCUMENTS

| | | |
|---|---|---|
| JP | 2003-152890 A | 5/2003 |
| JP | 2003-198724 A | 7/2003 |
| JP | 2003-264644 A | 9/2003 |

* cited by examiner

IN-MEMORY DATA OPTIMIZATION SYSTEM

RELATED APPLICATIONS

The present invention is a continuation-in-part of U.S. application Ser. No. 11/419,618, filed on May 22, 2006, which is a continuation of U.S. application Ser. No. 11/295,977, filed on Dec. 7, 2005, and which are both incorporated herein by reference, and also claims priority to provisional U.S. Application No. 61/167,359, filed on Apr. 7, 2009.

BACKGROUND OF THE INVENTION

A. Field of Invention

This invention pertains to database systems handling high volumes of data storage edits and/or retrieval. More specifically, a system and methods of creating customized structured data in memory stores ("molding memory") for storage and retrieval for different needs are described. These methods provide for considerable improvement in both the scalability of requests to be handled and the speed of process time. Examples of areas and industries for which this optimization may be particularly suited include, but are not limited to, telecommunications, financial branch/profit center based systems, biotech, biometrics, chronology based systems (i.e., security systems, electronic card swiping logs, etc.), matrix based systems, credit card agencies, and storage/retrieval based systems. This solution can be used with commodity hardware. Additionally, this solution can be applied to high-end hardware.

B. Description of the Prior Art

The ability to handle a large volume of data along with a rapid response to queries for immediate data retrieval has proven to be mission critical for a growing number of industries and business sectors. As computer processing power increases along with memory storage needs, corporations continue to create programs and databases reliant upon maximizing the resources of ever improving hardware. In order to be effective, from both technological and financial perspectives, these programs and databases continually require faster query/response times with the scalability to handle increasingly large volumes of data queries.

In general, a database is comprised of records and each record is comprised of fields. For example, a database comprising human resource records might have a record for each employee, with each record having a field with data describing start date, home address, salary, etc. In some cases, some fields may be left blank.

Generally, database retrieval systems operate under a query/response approach and the databases are structured to permit expansion as new data become available. Retrieval systems typically involve queries directed to the database. The query is "held" at the database until the proper payload is identified. Then a response message, inclusive of the identified payload, is formulated and sent in response to the originating message.

Currently, one commonly used programming method for increasing the speed and efficiency of responses relates to the way with which data is stored and is referred to as indexing. Indexing, generally, is the process by which the locations of stored records are identified and kept apart from the core table itself. Generally, the indexed data are alphanumeric or numeric. When numeric, the index typically does not always use consecutive numbers, and typically does not use consecutive numbers for later-entered records, but instead uses numbers representative in some computational way of the content of the data. A database index requires a database to have a tabularized structure and itself is a data structure used to improve the speed of retrieval. Using an index, the data in the database are organized in a column or columns for rapid random look-ups and efficient access of ordered records. Each data entry in the database is uniquely identified both to its tabular position and its physical location. Generally, as data are made available for storage in a database, the data are placed in available slots and the locations of the stored data are separately provided to be included in one or more indices. Each unique location identifier is referred to as a key. An index may, in effect, be considered a separate table of keys. Keys may be separately stored so that records may be broken up and stored in a variety of locations of a database, and the keys are necessary to identify all locations and are used to potentially recombine requested data.

In the described methodology, when a query is made to the database, first, the index itself is searched to identify applicable keys. This search may require multiple reads of the index table. In other words, for a single query the index may have to be accessed several times. The identified keys then provide location information for the requested data. An additional lookup is needed to retrieve the payload data. Once the data are retrieved, a response is formulated. Indices may be stored in memory or may be stored separately, and the type and location of storage influences access speed.

Databases in the prior art were historically designed to both assure data integrity (that is, the data in the database are "actual" data and not "artificial" place holders) and for ease of data entry. As a result, databases structured with an index or indices, generally only hold known keys that relate directly to known values. That is, "dummy" data are not included. For example, a database of telephone numbers would not include a non-existing phone number, such as 111-111-1111 and therefore, no key for the non-existent phone number is included in the index. However, a query could be generated for a non-existent record and non-existent key. In general, indices in the prior art are searched using an algorithm and, in general, the algorithm is directed to limiting the search population in successive iterations. When a non-existing key is searched for in the index, the search algorithm will have difficulty identifying the requested key and will generally cause a slowdown causing query response time to lag. In some indexing approaches used today, in order to improve searching in the presence of later-entered records, empty space may initially be left between consecutively numbered keys to permit insertion of additional keys to reduce the frequency of re-indexing. However, when no spaces are left, or when no spaces are made available for internal expansion, then existing keys must be replaced with redirection keys pointing to the end of the index allowing the new keys to be inserted so they are discoverable. Indices may periodically require re-sorting and, consequently, re-indexing, because data in the database has changed.

The speed of retrieval of entries within a database can vary considerably, depending upon the indexing methodology used. To improve retrieval speed, caching may be used in combination with indexing. Caching is implementation and storage of a select group of keys in a unique memory area so as to permit rapid access of the selected keys in the group. Often these are commonly accessed keys or recently accessed keys. When caching is in place, some or all keys may be stored in the cache, which serves to reduce the time for determining the initial key. However, even when caching is used, the index still may need to be searched before the record is accessed.

In addition, either the index and the actual data or both may be cached. Although caching improves retrieval times, caching only improves retrieval times of information that has been cached. Because not all data are cached, the variance in retrieval times may increase in the presence of caching, which could be problematic in some applications.

Access to indices requires multiple reads, and as keys are added to or removed from an index, the sort order deteriorates, requiring an increasing number of reads to access the required key, thus prolonging access time. Although caching may improve some retrieval times, other retrieval times may be lengthy, and as a result, high variability in response times may remain.

In summary, the indexing methodology, even when used with caching, results in wide variability in the time to respond to a database query, and, generally, the mean response time can still be improved. The present invention overcomes this limitation by using a keying system in which a database is pre-assigned to have a finite number of records with a key assigned for every possible entry within the required key range, thus eliminating the need for future intermediate insertion of additional keys.

Commercial databases, by design, are all-purpose without specificity to any single business or its requirements. Currently, commercial database applications generally rely on memory caching. The present invention discloses memory molding as an alternative to indexing. In the present invention the physical memory is structured to the specific needs of the given application. By molding memory, the performance speed of responses to queries dramatically increases over commercial database applications now in use.

SUMMARY OF THE INVENTION

The present invention is directed to methods for molding a memory store and for correspondingly storing and retrieving data in the memory store. The memory structuring is template driven, but tailored to meet specific needs of specific applications (examples of these methods are included below), thereby significantly improving access and response time for those applications.

Memory stores of commercial databases, by design, are all-purpose without specificity to any single application or its requirements. However, the present invention can work in conjunction with any database and any typically used database hardware. By using the present invention in conjunction with these commercial databases, it becomes possible to better customize the database to its particular purpose.

Physical memory is any memory, including RAM, Solid State Flash Drive, and Hard Drive, which may have the ability to be expandable. In the present invention, this memory is molded. By definition, molded memory is memory formatted to the distinct requirements of one or more applications. This format, unlike that of any database, utilizes different containers (partitioned memory) with the keys formatted in an unconventional way, meaning the address where the data resides is a mathematical function of the key, such as the product of the key value and the data length of the key entry. This style of memory addressing, as opposed to utilizing an index table, shortens the access time to the data by the number of reads normally required by the index. For example, in the prior art, in the case of a cache miss, a search for the requested key in the index would require multiple reads (at least two or more) even if the whole database were to reside in RAM. Assuming the data could be retrieved in only two reads (a rare best case scenario), the present invention, which requires only a single read for the same information, would already prove twice as fast as with indexing. In addition, in cases where the key is not found in the index (a common occurrence when new keys are added into the database), up to 8 or more reads are required. In both read and write lab tests done utilizing the same data and query structure, the difference in performance was nearly a 9.75 times improvement over indexing. In addition, because the invention is directed to memory molding and not to a particular hardware arrangement, the present invention may be used with any hardware presently used for commercial databases.

The methods of the present invention include several approaches distinct from the prior art. Particularly distinct is the elimination of indexing. By eliminating indexing, and utilizing a key based addressing system, where the address is, for example, a product of the key value and the data length of the key entry, a time consuming portion of a typical query and response is eliminated. In place of indexing, the present invention employs a structured method for memory molding.

As in the prior art, the content database of the present invention is comprised of records and each record may be comprised of a pre-defined number of fields. A key is defined as a relative record number. Each key is used to calculate the physical location of each record ("pointer") in a "container" where the "container" is defined as a logical partition in shared memory.

In summary, a portion of a memory store is allocated to the application. The memory is molded into container-based structures. Every container may be logically partitioned into n child-containers of defined size, provided their total size does not exceed that of their parent container. A container may be created using one or more templates, any of which may be prepared specifically to the application. Data may be accessed within a container and/or across containers.

Any hardware that can support memory sizes above the memory storage required for the given application(s) may be used. For example, if the memory size required is up to 4 Gb, a 32 bit processor may be used, beyond that, a 64 bit processor or higher may alternatively be used. Any typical Operating Systems that support shared memory space across processors/threads/applications (i.e., Linux, CentOS, Solaris, Windows, Mac OS, etc.) may be used. The shared memory is all memory available in a device excluding the Operating System memory requirement.

The following paragraphs describe some embodiments of the present invention.

For a table-based database (such as used in IPJunction™, available from Marteleron, 51 E. 42 St., New York, N.Y.), the number of tables, number of records, the number of bytes (or pointer length), and key size must all be defined. Each key must be numeric, where the product of the key value and data length of the entry must fit within the addressable memory of its parent container. The key is used to find a memory location. This can be done by any number of calculations, such as by equating the location of the requested pointer as a predetermined function of both the key and the pointer length, where the pointer points to an exact record location on a different table within the same or different container that may or may not be residing in memory.

For a bitmap-based application, such as for broadcast data, the templates could provide for single frame, multiple frames, or multiple pages, for use with data representing three-dimensional information. In this type of application, the user needs to define the length and width of the bitmap, including the product of the length multiplied by the width, which cannot exceed the bit-size of the parent container. The parent container can hold multiple bit-map pages, thus enabling the creation of 3-D bit-maps or multiple frames/pages.

Other applications may require multi-dimensional templates. For example, banking applications for branches/profit centers are well suited to using multi-dimensional templates so that a firm can readily analyze daily companywide profit/loss. Multi-dimensional templates are also well suited for retrieving state or Federal motor vehicle or driver information and for rapid countrywide search and response. Query and response systems reflecting credit card activity are also candidates for multi-dimensional templates. Similarly, identifications systems, including voting systems and National ID Cards, can use multi-dimensional templates for creating databases, because the templates lend themselves to rapid check and elimination of duplication by prevention of duplicate Social Security entries. In a dimensional system, each dimension represents a category or criteria by which the data is classified. These dimensions relationally link the data. In these types of systems, the user must define the number of dimensions, the size of each dimension based upon the largest number used in the dimension, the pointer or record size, and must then calculate the requisite container size.

Alternatively, chronology-based templates can be used. Chronology based systems can retrieve information much faster, i.e., security systems, electronic card swiping logs, etc.

To implement the present invention, the database must be sized and structured based upon anticipated maximum need. For example, if the database is anticipated to have keys in the range of 1 to 1000, and each record to which a key is pointing is expected to have a finite length, then the table is sized accordingly, and exactly 1000 keys are assigned, even though all 1000 records may not be populated at the time the table is sized and structured. A single container may house the table with 1000 keys. All the records may be assigned to one or more "containers" of defined size. In the present invention, the keys are consecutively numbered. The records may include data and/or pointers to other records.

In the methodology of the present invention, the database size is set by the user in advance. Each key entry may hold a pointer to a record, multiple keys may point to a single record, a key can hold pointers to multiple records, or a key can point to a single record. So long as the database size is structured for growth and each key has an entry, then additional records may be added by appointing keys to those new records. In addition, each record may also be updated, just as records today are updated.

In the event that there is a need to increase the quantity of keys, for example from 1-100 to 1-1000 (and therefore the range of the key values), there are numerous means available to overcome this issue. For example, combinations of changing relative container and table sizes, increasing quantities of containers or table sizes, adding physical memory and/or increasing allocated physical memory and restructuring the database catalog may be used.

No matter which means are used, there is no need to re-sort or re-index, because indices are not used. Further, if the container size is re-defined, the range of the keys concurrently may be increased.

A "container" is defined as a logical partition of shared memory. A container may be structured using many different template designs, and different containers may employ different template designs. The template for containers may include logical partitioning of the container into n child-containers of any size, provided the total size does not exceed that of their parent container. Data may be accessed within a container and/or across containers.

The present invention also uses a structured key based addressing system, wherein consecutive numeric keys are used, the number of keys is limited, and the user prescribes the limitation and structure based upon the maximum quantity of anticipated keys. The methods of the present invention provide for accessing a required key in a single read per table, resulting in overall improvement in access and response time. Queries to the database are based on the key. Any re-sizing of the keys, i.e., changing the key from 4 bytes to 6 bytes, when necessary in the prior art, requires restructuring and re-indexing the table(s). In the present invention, although the size of the database is initially limited, it still may be expanded through a container redefining process. Further, although the database of the present invention is structured and limited in size based on available memory, the keying methodology is still customizable to cover the full range of both required and possible keys for a given application.

Further, every key is assigned an entry, even if the key may not be associated with actual data. Therefore, every key location is "filled", even when a key would not otherwise be needed and which would otherwise not be available, thus eliminating the need for indexing. There are no empty spaces left between consecutive keys. In addition, because every key has an entry, null values may be used, and no keys are associated with blank entries nor are entries for keys unknown. Even if the record related to a given key or keys is later deleted, the key or keys remain behind and null values replace prior values so that a "not found" response is returned at the same speed as a "found" key.

For example, to customize the database of the present invention for an application whose keys consist of three digit serial numbers, the database would include keys in the full range of every possible three-digit number from 000-999. Every one of the thousand keys in this example would each have a corresponding entry, ensuring all possible keys are known, both existing and non-existing.

The methodology of the present invention results in considerable improvement in response time to a query. This improvement is attributable to a combination of factors including (a) the queries being based directly on the keys, (b) the use of a constrained structure in which no entries are "vacant", (c) the structured location of data, and (d) the finite database size. Also, the lack of an index limits the quantity of reads associated with any query. As a result of the database structure, all queries require only a single read per table, and the search can be accomplished in a direct manner.

Further, the method of the present invention does not limit the starting key value, i.e., any positive or negative value, including zero, may be used. In addition, every consecutive numeric key is used. In addition, the tables used in the present invention can be readily updated and are amenable to typical means for reads and writes to them.

The solution of the present invention improves query/response time from a highly variable range of potentially many orders of magnitude to a consistently lower range of variability. In addition, the average response time improves greatly. Databases in the prior art fluctuate in their search times depending upon the time taken in finding the key in cache memory or the number of reads required within the index. Therefore, prior art access time may vary between nanoseconds and milliseconds or even longer, and are especially longer when the search encompasses non-existent keys. Because the present solution requires only a single read per table to find any record and each key has an entry, the solution of the present invention is consistently faster and more efficient than other solutions.

The methods of the present invention do not preclude separating the database from the query source and using a common accessing protocol, such as but not limited to Internet Protocol (IP), for accessing a database remote from the query source.

DETAILED DESCRIPTION OF THE INVENTION

Figure 1:
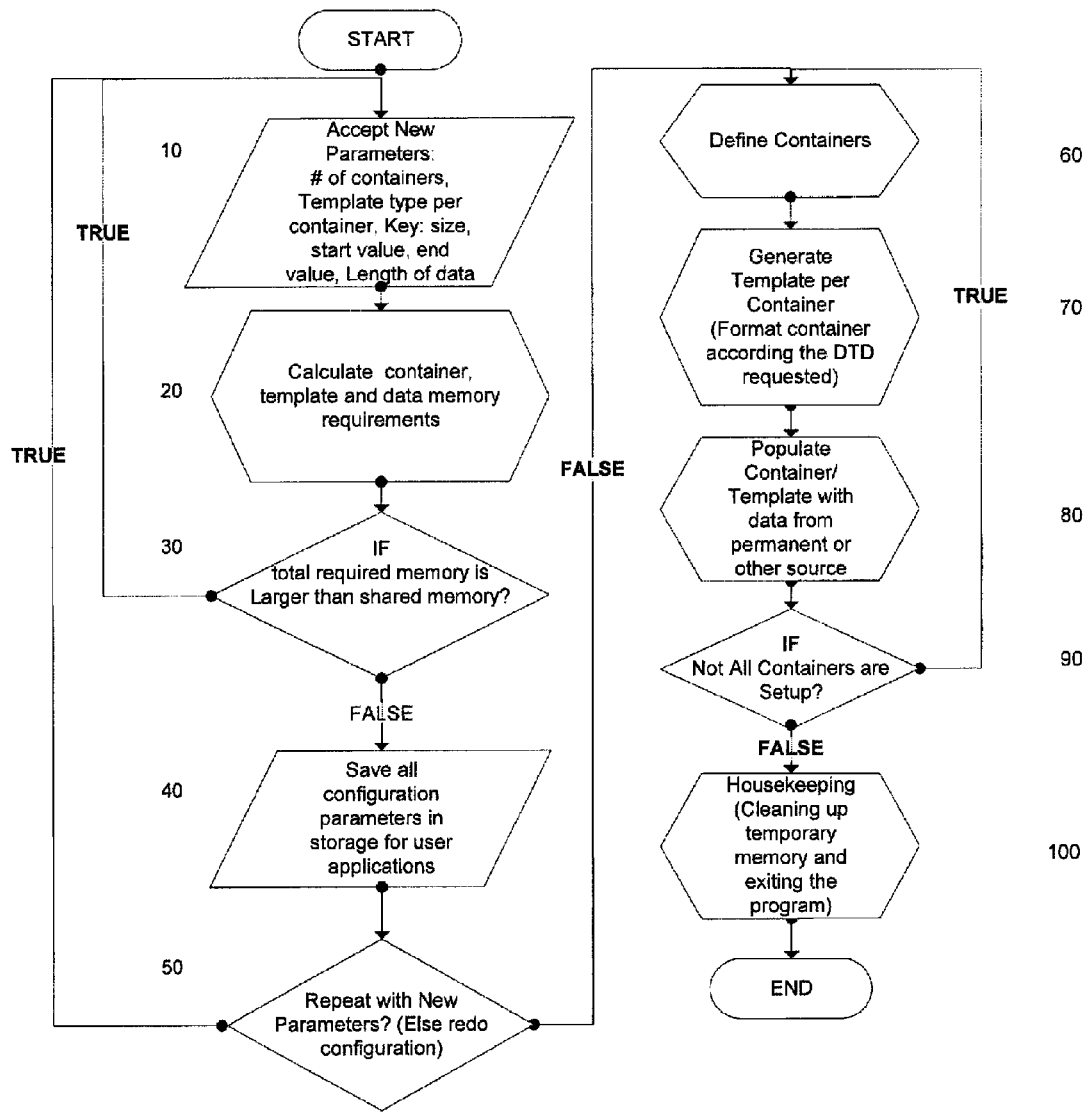
FIG. 1 (Shared Memory Molding Flow Chart) shows a process of defining, setting up, and loading the shared memory database.

The present invention is directed to methods for creating a cataloging system for a memory store and accessing the memory store and associated databases. The present invention requires a physical memory store for storing data. In general, the physical memory store may be in the form of a hard drive, solid state memory, RAM, or any other typical device used for data storage, and may also be in the form of a plurality or combination of said devices. The present invention can also use a shared memory. That is, only selected portions of the physical medium may be used with the present invention and other portions of the physical medium may be available for other possibly unrelated applications. Alternatively, the memory store for the present invention may be distributed across a plurality of physical media, and any or all of these may be shared.

In the implementation of the present invention, portions of memory need to be apportioned to serve as containers, each of which is of a particular size. The structure of the memory store and each container is identified during the memory molding process through creation of a template design. A container may be structured using many different template designs, and different containers may employ different template designs. The template for containers may include logical partitioning of each container into n child-containers of any size, provided the total size does not exceed that of their parent container. Data may be accessed within a container and/or across containers.

Each container is structured to house one or more tables. Each table is comprised of record entries with each entry corresponding to a key. In addition, keys may point to multiple records. For example, a table with 1000 keys will point to 1000 entries, and some of those entries may be identical. In one embodiment, tables may be located close to the beginning of its containers and keys may be located near the beginning of each table.

Because the overall size of the containers is limited by the memory, the size of the container must be selected to accommodate data entries of all anticipated sizes without "overflowing". In addition, because containers are used for different data or multiple dimensions of the same data, the number of containers and type of templates applied to create the container(s) depends upon the application. For example, a telecommunications application may use pre-scaled templates, but additional templates that are application-specific may also be created. A pre-scaled design could be a container comprised of a single table consisting of ten billion entries representing every possible combination of a ten digit phone number from 000-000-0000 to 999-999-9999. An open-ended design could be a container comprised of a template defining a single table capable of holding up to ten billion phone number keys with pointer entries to the gateway address table in a second container, not neccessarily all of which are in immediate use. Those not in immediate use may be used at a future date for the sake of expanding the number of table entries. A second container may be created capable of holding a table with a capacity of 64 million gateway address records addressable by the different key pointer entries from the table of the first container. As such, a solution may be comprised of multiple containers.

A container is structured internally according to a template. The template is a constructor of the logical layout of the data in the container, defining the quantity and type of recipients, such as tables, and their structure, key length, range, record and field lengths, etc.

A variety of templates can be implemented. The template or templates selected for use depends upon the needs of the given application. It should be noted that although different templates may be used concurrently, some templates may be better suited for some applications than others. The better suited the template is to a given application, the less complex the logic of the given application will ultimately be. For example, if one is storing streaming video frames in memory, the preferred template would possibly be a bitmap based design because every frame is a bitmap object belonging to a single class; so all the frames have the same inherited behavior. As a result, utilization of a bitmap based template, which may be defined with constructs similar or equal to those of a given video frame stream, resolves the complexity of the process of streaming video frames. A different template may not resolve this complexity as efficiently.

The necessary container size can be determined by multiplying the maximum key values and the pointer or record length. For example, in a 3-dimensional environment, if the maximum key value in dimension 1 is arbitrarily selected to be 171, in dimension 2 the maximum key value is arbitrarily selected to be 333, and in dimension 3, the maximum key value is arbitrarily selected to be 3403, and the pointer or record size is arbitrarily selected to be 8 and the starting value is arbitrarily selected to be 1, the parent container will be required to have at least 1,550,216,232 bytes. A one-dimensional table template, for example may contain a single field record, creating a single column of homogenous data. A two-dimensional table template could include records with two or more different fields, yielding greater variation of data than could be obtained from a one-dimensional table template. A three-dimensional table template could include pages of records where each page can have up to the same amount of records, and each record can have up to the same amount of fields as the largest page, each with two or more different fields.

A one-dimensional table template may be used in cases where there is a single value per key entry, such as a pre-defined phone number table with a redirection phone number (i.e., Local Number Portability). A two-dimensional table template may be used to define a table that returns multiple values, such as a phone list that provides name, address, phone number, etc. and can be envisioned to be similar to a two-dimensional chart, such as a spreadsheet. A three-dimensional table template may be used to define two-dimensional data over a chronological scale, such as stock trading where data is collected into the database on a daily basis. This enables retrieval of data over time for each field value, such as percentage gain and loss, price-to-earnings ratios, etc.

The key is not written in memory rather, it is measurable in memory as the distance relative to the beginning of the container. The key location is the product of the key value and the data length of the key entry. Therefore, being able to calculate the key's location in memory renders unnecessary having to write the key in memory, thus saving space within the container.

FIG. 1 provides a flow chart of a simple shared memory molding process of the present invention. More specifically, initially, an interface to assist in constructing the number of containers and their associated template(s) in the appropriate combinations is prepared 10 to define the shared memory. In particular, parameters requiring definition include the number of containers, the type of template necessary per container, the key range to be used, the key size, the start and end values for the keys, and the length of the data (in essence, the size of each container or entry). Once the parameters are known, the structure can be verified 20, including calculating the container size and the requirements for the template size and data size.

For example, the structure may be calculated and validity checked using the example below:

Table$_1$=(end key$_1$–start key$_1$)*length of data$_1$

Table$_2$=(end key$_2$–start key$_2$)*length of data$_2$

Table$_p$=(end key$_p$–start key$_p$)*length of data

Container=$\Sigma^1_p$ table size$_x$

Shared Memory Size=$\Sigma^1_n$ container$_x$

A comparison 30 is then done between the available physical memory and the needs for the database. If the available physical memory is not sufficient, then a new configuration must be defined. If not, the configuration is saved 40 and the process is repeated 50 for any additional containers.

At this point, the containers themselves are defined and constructed 60. A template for each container is then generated 70 and population 80 of the container using the template can begin. The option to populate additional containers is then validated 90 and if additional containers need to be populated, then the next container can be defined and constructed 60. Finally, any housekeeping 100, such as temporary memory clean up is done.

To utilize memory molding, within a selected template, the user must define the number of tables, and the number of keys is equal to the key range which is defined by the difference between the start key value and the end key value. The key itself must be numeric or convertible to a numeric value, and the product of the numeric value and the key entry's data length must fit within the addressable memory relative to the beginning of its container. The key is used to determine a memory location inside a container using a calculation methodology. The pointer (key entry) works by pointing toward an exact location record in a table.

Figure 2:
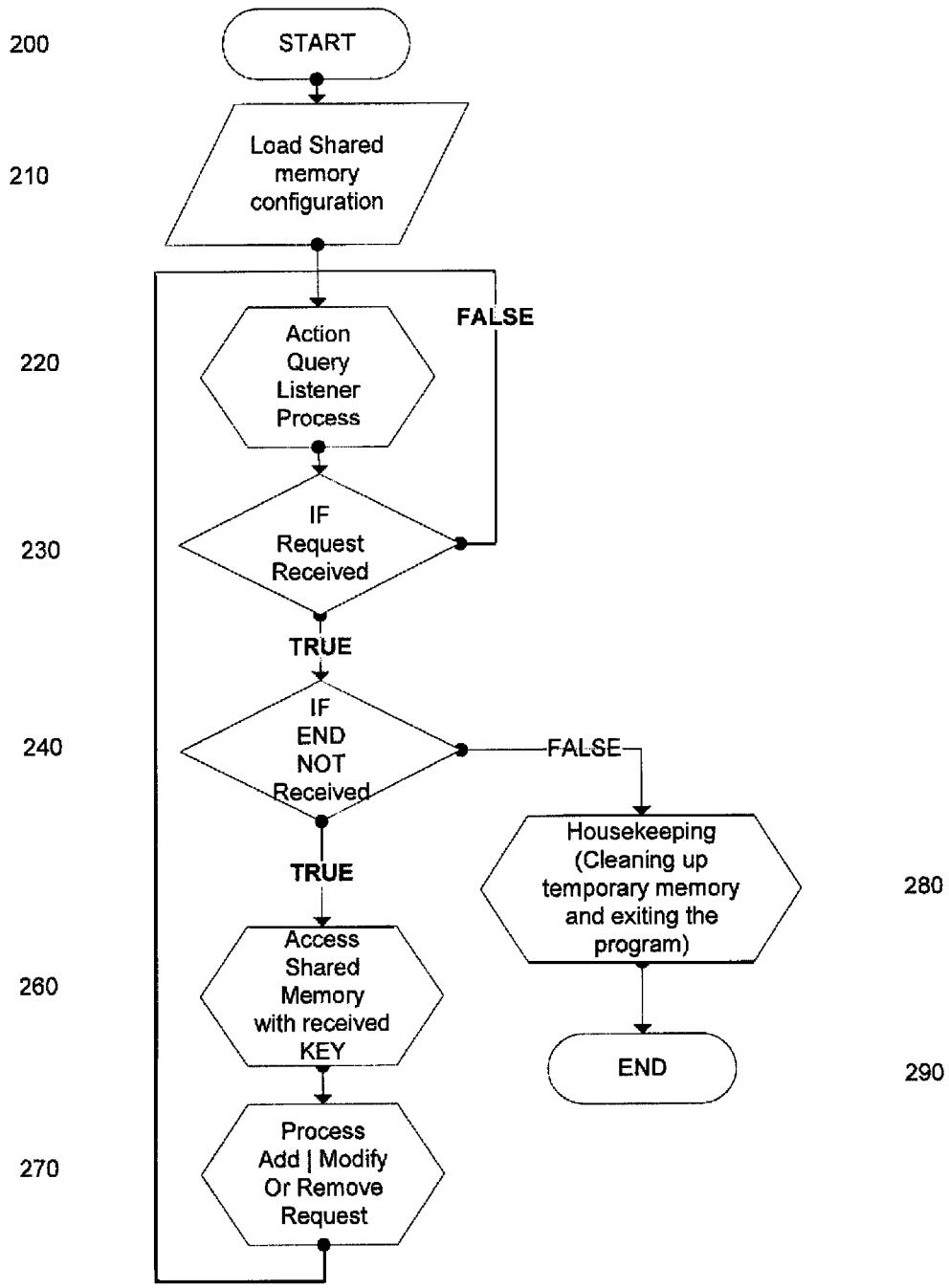
FIG. 2 (Shared Memory Update Sample) shows a utilization process of the shared memory database for updates.

FIG. 2 is a simplified flow chart showing an example of shared memory update with the assumption that shared memory is already populated. Beginning at step 200, the shared memory configuration is loaded 210 followed by listening and waiting for Action Queries from in process routines and/or external applications 220. In decision box 230, if and when requests are received, the process continues to 240, otherwise the process returns to 220 for further listening and waiting for Action Queries. If an end of program request is received 240, and all requests are satisfied, housekeeping 280, such as temporary memory clean up, is done and the program terminates 290. If an end of program request is not received, shared memory is accessed with received key 260, and the process for updating the memory with the action requested (add/modify/remove) 270 is performed, followed by a return to decision box 230.

Figure 3:
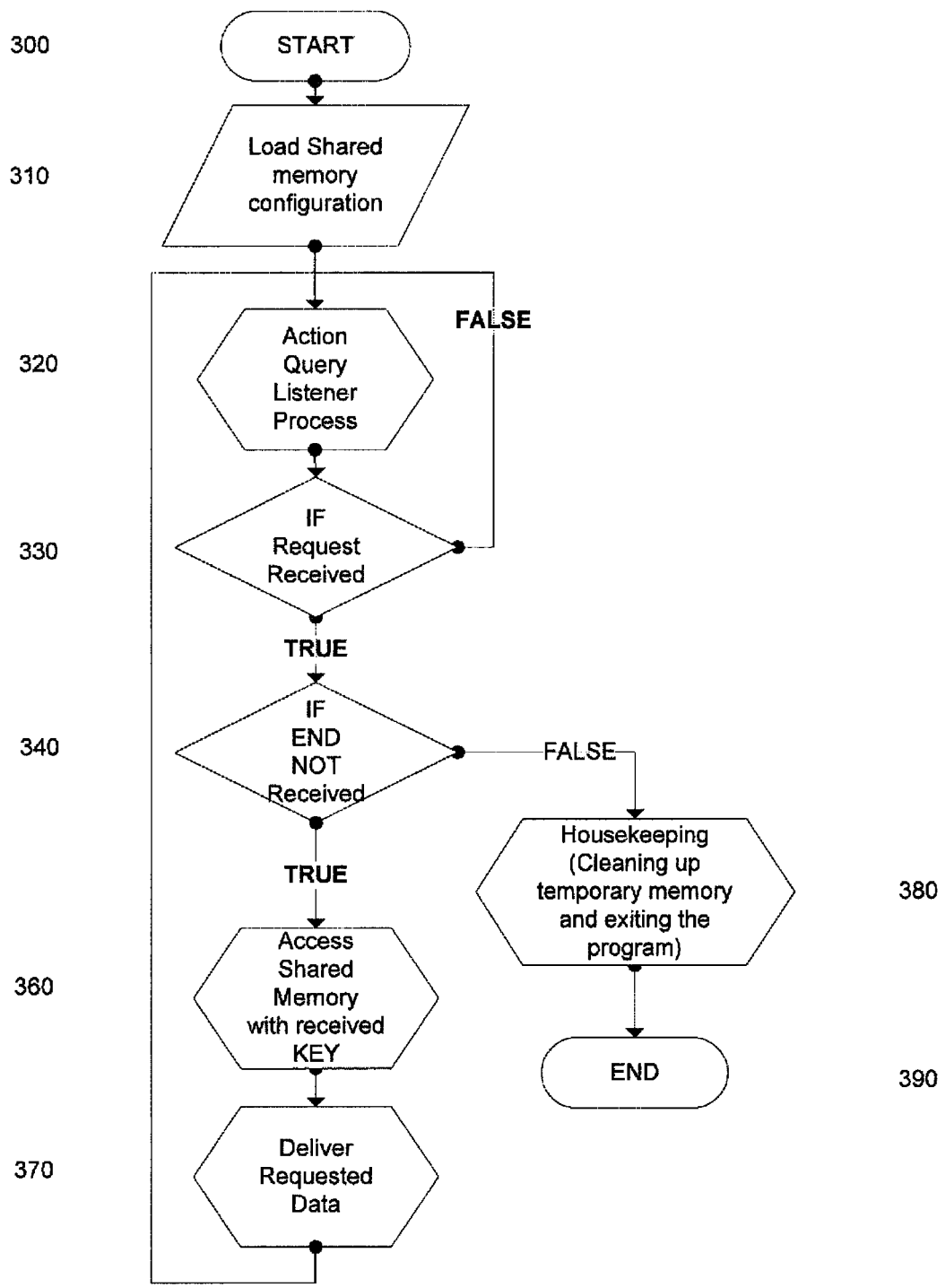
FIG. 3 (Shared Memory Query Sample) shows a utilization process of the shared memory database for query and response.

FIG. 3 is a simplified flow chart showing an example of shared memory query (read) with the assumption that shared memory is already populated. Starting with step 300, the shared memory configuration is loaded 310 followed by listening for Action Queries from in process routines and/or external applications 320. In decision box 330, if and when requests are received, the process continues to 340, otherwise the process returns to 320 to listen and wait. If an end of program request is received 340, and all requests are satisfied, housekeeping 380, such as temporary memory clean up, is done and the program terminates 390. If an end of program request is not received, shared memory is accessed with received key 360, and the process for delivering data requests 370 is performed, followed by a return to decision box 330.

Figure 4:
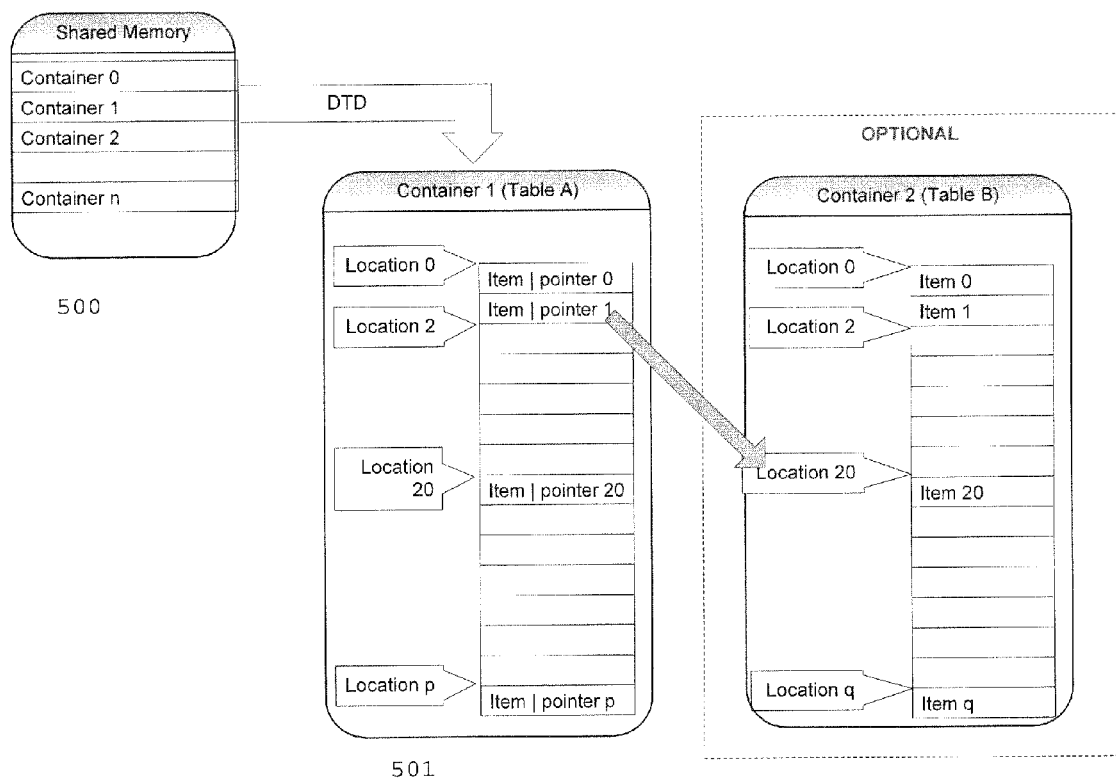
FIG. 4 (Table Based Template) shows a container defined with one or more relational tables.

FIG. 4 shows an illustrative example of the implementation of the present invention in which the fields of a record may be stored in different containers. Additional templates, although not shown as Figures, could also be developed and used based upon particular applications. In the example in FIG. 4, at least some portion of shared memory 500 is containerized. Although a portion of memory 500 may be used for a database in the present application, other portions of memory 500 may still be used in unrelated applications. When containerized, a series of n containers are created, reflecting the number of partitions in memory for use by one or more applications. Each of the n containers 501 in memory 500 represents a table. Each entry in the table is defined by a location and the location's contents include both an item and a pointer. The pointer is potentially used to identify a corresponding location in an additional table where another portion of the same record is stored.

Figure 5:
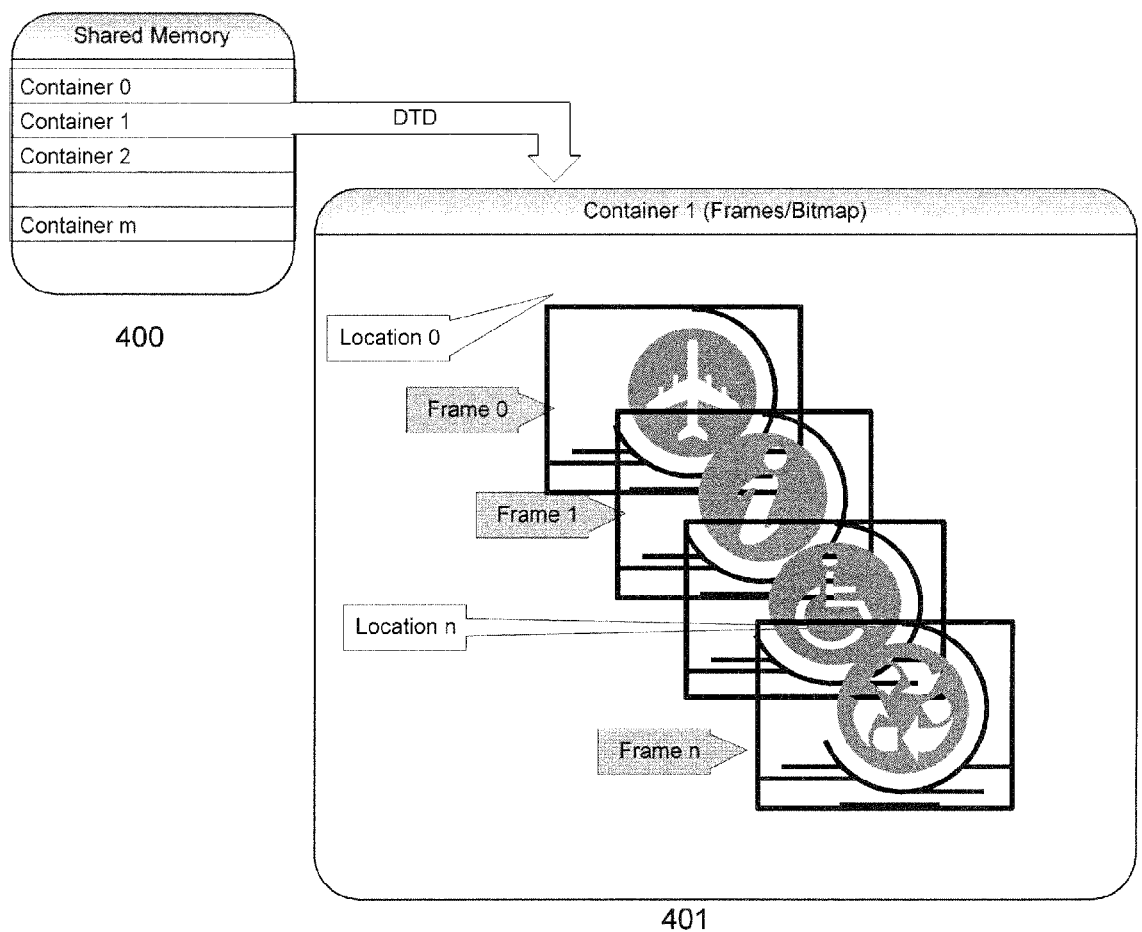
FIG. 5 (Dimensional/Screen Template) shows a container defined as a three dimensional table.

A second example is shown in FIG. 5 related to a database of bitmapped figures. In the example, at least some portion of memory 400 is containerized. Although a portion of shared memory 400 may be used for a database in the present application, other portions of memory 400 may still be used in unrelated applications. When containerized, a series of n containers are created, reflecting the number of partitions in memory for use by one or more applications. Each of the n containers 401 in memory 400 may contain a table holding a series of frames with each key identifying a frame of a bitmapped picture. When a query is made for a particular picture, the location of the frame is identified and the bitmap is returned in response to the query.

In order to establish the proper container size in the bitmap application, the user needs to define the payload of a table, where a table consists of records and where each record may consist of a single frame, multiple frames/pages, or a logical 3-D entity The user must also define the length and width of the bitmap(s)/frame(s), field lengths (if there are fields), the number of records per page (if there are pages), the number of pages per table (if there are pages) and the size of the table, which consists of records or pages. Each record may be sized by the product of the length, width, and quantity of bits per frame plus the length of the available fields on the record. Each page may be sized by multiplying the record size by the number of records per page. The total table size may not exceed the size of the parent container.

In another embodiment, a container may contain multiple pages where each page may be a video clip consisting of a collection of bitmaps holding images or video frames. Each video clip may consist of the same amount of bitmaps or frames as the largest page.

Figure 6:
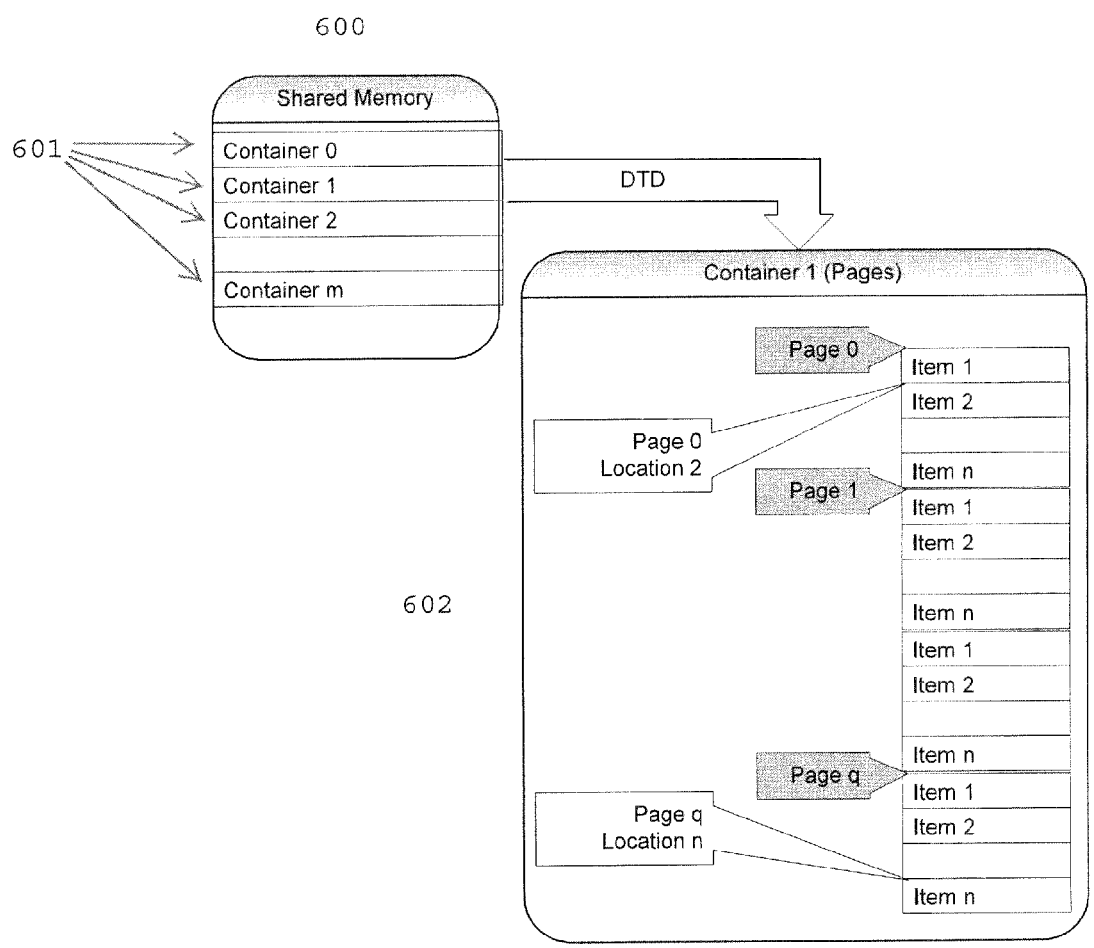
FIG. 6 (Frames/Bitmap Template) shows a container defined as relational frames or bitmaps.

In the example shown in FIG. 6, at least some portion of shared memory 600 is containerized. Although a portion of memory 600 may be used for a database in the present application, other portions of memory 600 may still be used in unrelated applications. When containerized, a series of m containers are created, reflecting the number of potential entries in the database. Each of the m containers 601 in memory 600 represents both page number and location number. In the example shown in FIG. 6, container 602 (container 1) includes q pages, each with n items.

When implementing the embodiment shown in FIG. 6, the user must define the number of dimensions. The key range of each dimension is based on the difference between the starting key value and the ending key value used within that dimension. The necessary container size can be calculated by multiplying the number of keys within the range by the pointer or record length, i.e., In a 3-dimensional environment, if the key range in dimension 1 is arbitrarily selected to be 1 through 171 (171 keys in the range), in dimension 2 the key range is arbitrarily selected to be 1 through 333 (333 keys in the range), and in dimension 3, the key range is arbitrarily selected to be 1 through 3403 (3403 keys in the range), and the pointer or record size is arbitrarily selected to be 8 bytes, the parent container will be required to have at least 171×333×3403×8 bytes=1,550,216,232 bytes.

In another embodiment, a table may contain multiple pages of items where each page may contain a collection of records related by subject matter. For example, if one is creating a multi-year budget application, every budget year may be represented by a page holding the same line items (collection of records), i.e., rent, office supplies, etc. In a multi-dimensional system, each dimension represents a category or criteria by which the data are classified. These dimensions relationally link the data. For example, corporations which use branch/profit center based systems can use the present invention for daily companywide profit/loss comparative analyses. The structure allows chronology based systems, i.e., security systems, yearly budgets, electronic card swiping logs, etc, to retrieve data faster than in the prior art. Another example application is motor vehicle data based on state and license plate. The present invention can also be used for rapid countrywide search and response or for voting systems for immediate check and elimination of duplication by prevention of duplicate Social Security entries. Credit Card agencies are also candidates for utilization of the present invention in that each card number can have relation to numerous other data.

The present invention may be executed on any general computing device with access to stored memory, in a variety of systems, including a variety of electronic devices under a number of different operating systems.

A variety of memory storage devices may be used in the present invention. Here we define physical memory stores as storage that can be accessed directly, i.e., RAM, Solid State Flash Drive, Hard Drive, etc. In one embodiment of the present invention, in which the quantity of records can be increased, any of the physical memory stores would be expandable, either by allowing for additional records and/or using available memory to increase the container and table sizes and/or using available containers to increase table size and/or by adding hardware (such as a second Hard Drive).

Also, the present invention is not limited to a single type of hardware for an application. For example, some data may be in RAM and other data on a Hard Drive. The memory store can be molded into different structural configurations in order to optimize performance for various applications. When applicable, memory molding will dramatically increase performance speed of the customized application.

The present invention may be executed on any general computing device with access to a memory store including a variety of electronic devices under a number of different operating systems. In one embodiment of the present invention, the hardware upon which the solution may be implemented includes, but is not limited to, a portable computing system such as a notebook or laptop computer, a palmtop computer, a personal digital assistant, a video graphics card or other electronic computing system with access to stored memory. The solution may also be implemented, for example, on hardware which includes, but is not limited to, a desktop computer, a network computer, a midrange computer, a server system, a clustered system, a mainframe computer or a grid. Therefore, in general, the present invention is preferably executed in a computer system that performs computing tasks such as manipulating data in storage that is accessible to the computer system.

An exemplary system for implementing the solution includes a conventional blade server using a 64-bit processor, a compatible blade, a 1 Gb network card, 128 GB of memory and 2 TB of storage. The blade server may be any number of commercially available servers, including, but not limited to Sun Microsystems' 6000 series. The processing unit may be any of a various commercially available processors, including Intel, and others. The operating system may also be any of a number of commercially available operating systems including Linux, CentOS, Solaris, Windows, Mac OS, and others.

It is also to be understood that the following claims are intended to cover all of the generic and specific features of the invention herein described, and all statements of the scope of the invention which, as a matter of language, might be said to fall there between.

I claim:

1. A method for a processor controlling a database to respond to a query for stored data from said database, said database comprising a table of consecutively numbered keys and a plurality of records, where each record corresponds to one of said keys, comprising the steps of:
    receiving a query message for a desired record corresponding to an applicable key, said query message containing an indicator of said applicable key;
    determining said applicable key for the desired record by calculating a function of said indicator of said applicable key; and
    formulating a response message including the content of the desired record or including data indicating that the desired record is empty of content.

2. The method of claim 1 wherein the numbering of each key corresponds to its memory location.

3. The method of claim 1 wherein the content of the desired record includes a pointer to a different record associated with said applicable key.

4. The method of claim 3 wherein said method further includes the steps of said processor formulating a further response message including the content of said different record and delivering said further response message in response to said query.

5. The method of claim 1 wherein said database does not include an index table.

6. The method of claim 1 wherein said key numbers are telephone numbers.

7. The method of claim 1 wherein said key numbers are of a ten digit length.

8. The method of claim 1 wherein said key numbers represent communication network addresses.

9. In a data processing system including input means for loading data and multiple programs, a processor for manipulating data under the control of one of said programs and a storage storing said programs and said data, said storage including a database structured so as to include a table of keys where each key is named for its location address, the keys being consecutively numbered, and said database comprising at least one record corresponding to each address, a method for accessing queried stored data comprising the steps of:

receiving a query message from a device with a network address for the content of a desired record, said query message containing an indicator of the applicable key to which the desired record corresponds;

determining the applicable key by calculating a function of the indicator of the applicable key; and formulating a response message including the content of the desired record or data indicating that the desired record is empty; and delivering said response message directed to said network address.

10. The method of claim 9 wherein the desired record includes a pointer to another record associated with said applicable key.

11. The method of claim 9 wherein said database's addressing scheme does not include an index table.

12. The method of claim 9 wherein said key numbers are telephone numbers.

13. The method of claim 9 wherein said key numbers are of a ten digit length.

14. The method of claim 9 wherein each key number represents a communication network addresses.

15. A data processing system for accessing stored data comprising:

an input means, an output means, a processor for manipulating data, and a storage comprising a database structured so as including a table of consecutively numbered keys and data records, where each key is numbered for its memory location and each data record is associated with one key;

wherein said processor receives a message formed as a query for a desired data record, said query including an indicator of the applicable key to which the desired data record corresponds, said processor determines the applicable key by calculating a function of said indicator of the applicable key, said processor identifies the desired data record, and said processor formulates a response message including content of the desired data record or including indication that said desired data record is empty.

16. The system of claim 15 wherein said database does not include an index table.

17. The system of claim 15 wherein the desired record includes a pointer to another data record in said database corresponding to said applicable key.

18. The system of claim 15 wherein said key numbers are telephone numbers.

19. The system of claim 15 wherein said key numbers are of a ten digit length.

20. The system of claim 15 wherein each of said keys identifies a communication network address.

\* \* \* \* \*